May 18, 1937. L. J. MAZOYER ET AL 2,080,948
PROCESS OF MAKING A COMBINED BOTTLE STOPPER AND SYRINGE
Filed Aug. 30, 1934

INVENTORS
LEON J. MAZOYER
CECIL JONES.
BY *Hauff Harland*
ATTORNEYS.

Patented May 18, 1937

2,080,948

UNITED STATES PATENT OFFICE 2,080,948

PROCESS OF MAKING A COMBINED BOTTLE STOPPER AND SYRINGE

Leon J. Mazoyer, Baldwin, N. Y., and Cecil Jones, Red Bank, N. J., assignors to Whitall Tatum Company, New York, N. Y., a corporation of New Jersey Application August 30, 1934, Serial No. 742,076

6 Claims. (Cl. 18—59)

Our invention relates to a process for forming articles in which hard and soft rubber are integrally united. More specifically, our invention is directed to a combined bottle stopper and syringe having a bulb and a seat for a bottle top composed of soft rubber and a threaded skirt portion composed of hard rubber integrally united to the soft rubber.

Various attempts have been made to devise a satisfactory combination bottle stopper and syringe. These attempts have not been successful, however, because the liquids with which these devices are employed ordinarily cause rubber to swell, whereby the stopper portion is distorted so as to no longer fit the bottle, or the attachment between the dropper and the bulb becomes so distorted as to permit the dropper to separate from the bulb.

The principal object of our invention is to provide a combined bottle stopper and syringe in which the defects attending those previously devised are eliminated. To this end we have constructed a combination of the character described in which a threaded skirt portion of hard rubber is integrally connected to a bulb made of soft rubber.

Another object of our invention is the provision of a process for making our improved combination stopper and syringe and for making any other object in which hard and soft rubber portions are integrally united.

We have found that, if certain precautions are observed, hard and soft rubber can be readily united to form an integral body. To accomplish this, we employ two different vulcanizable compositions, one for the soft rubber portion and the other for the hard rubber portion. The essential difference between these compositions is their respective contents of sulphur. For the soft rubber composition we employ slightly more sulphur than is customarily employed for the formation of a soft rubber vulcanizate for the purpose hereinafter specified. For the hard rubber composition we employ the quantity of sulphur which is customarily employed for making hard rubber vulcanizates. The quantity of sulphur employed in each composition will vary depnding on the other ingredients of the composition and can be readily ascertained by a few experiments with any desired composition.

The following specific compositions have been found to be particularly suitable. These specific examples are not to be taken as definitive of the scope of our invention but illustrative of one specific embodiment of our invention.

Hard rubber—Compound No. 652

| | Lbs. |
|---|---|
| Smoked sheets | 30. |
| Guayule | 6. |
| Sulphur | 16. |
| Carbon black M. B. #114–A | 8. |
| Lime | 3. |
| Zinc oxide, N. J. spec | 2. |
| Trimene base (triethyltrimethylenetriamine) | .125 |
| West whiting | 32.875 |
| Cottonseed oil | 2. |
| | 100. |

Soft rubber—Compound No. 651-B

| | Lbs. |
|---|---|
| Smoked sheets | 30. |
| Trimene base (triethyltrimethylenetriamine) | .5625 |
| Captax M. B. (90 percent Ceylon rubber and 10 percent mercaptobenzothiazole mixed together) | .1875 |
| #1114–A carbon black M. B. | 4. |
| Guayule | 2. |
| Sulphur | 2.625 |
| N. J. spec. zinc oxide | 3.5 |
| Lime | .4375 |
| M. R. X. (asphalt-like hydrocarbon) | 3. |
| Rosin oil | 1. |
| Barytes | 18. |
| Cured scrap | 25. |
| West whiting | 9.6875 |
| | 100. |

If guayule is not employed the quantity of smoked sheets must be considerably increased and the smoked sheets must be finely ground. Other fillers than those mentioned can be employed and the accelerator specified can be replaced by other substances known to be useful in this capacity.

The two compositions are of a dough-like consistency. They can be joined together by first being subjected to pressure at a temperature sufficient to effect the vulcanization of the soft rubber composition. Sufficient heat for this purpose can be supplied by steam introduced into jackets around the press chamber. After this treatment the hard rubber composition is softer than the soft rubber composition. The joined body can be then subjected to the action of live steam whereupon the hard rubber composition is vulcanized. It is in order to prevent the soft rubber vulcanizate from becoming tacky by the action of this live steam that the slight excess of sulphur is employed in the soft rubber composition.

The application of our process to the manufacture of a combined bottle stopper and syringe will be apparent from the following detailed description of the accompanying drawing in which.

Figure 1:
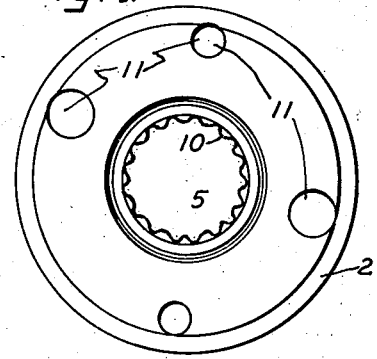
Fig. 1 is a plan view of the skirt molding portion of the molding press.
Figure 4:
Fig. 4 is a perspective view of a blank for forming a bulb.
Figure 5:
Fig. 5 is a perspective view of a blank for forming a threaded skirt portion.

Referring to the drawing in detail, 1 represents the metal base of the pressure mold. 2 is the skirt forming portion of the mold and 3 is the top of the mold. Projecting from the face of member 3 is a threaded cylindrical member 4 which is adapted to pass through a central opening 5 in member 2 and nest in a central depressed portion 6 in member 1 to form the threaded skirt portion. Projecting from the center of the bottom face of member 4 is a spindle 7 which is adapted to mate with a recess 8 in member 1 to form the bulb. The base of spindle 7 is of reduced diameter and is provided with an annular flange 9, the function of which is to form a circumferential groove near the base of the bulb to receive the flared end of a glass tube. The circumference of the opening 5 in member 2 is provided with corrugations 10, the ends of which are spaced from either face of member 2. These corrugations are of the utmost importance because in the molding operation they give member 2 a purchase on the skirt portion of the bottle stopper whereby it is possible to pull the skirt portion off the threaded member 4; otherwise, it would be virtually impossible to remove the skirt portion from said threaded member.

Members 1 and 2 are provided with registering holes 11 which are adapted to receive pins 11a projecting from the bottom face of member 3 to keep the parts in alignment.

Figure 6:
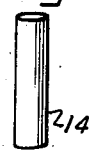
Fig. 6 is a perspective view of a soft rubber plug which combines with the blank shown in Fig. 4 for forming the bulb.
Figure 2:
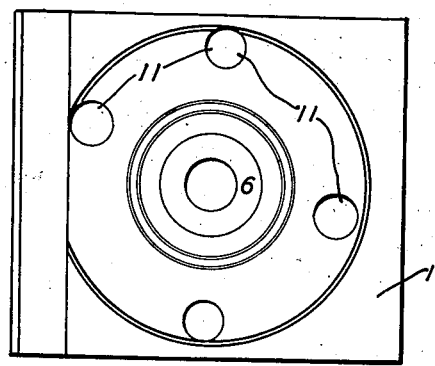
Fig. 2 is a plan view of the base of the molding press.
Figure 7:
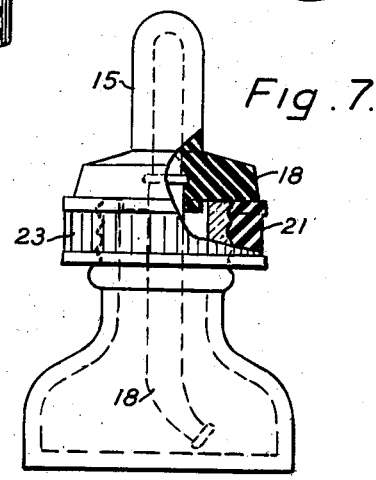
Fig. 7 is a front elevation of a bottle with the combined stopper and syringe attached and Fig. 8 is a vertical section of the combined bottle stopper and syringe.
Figure 3:
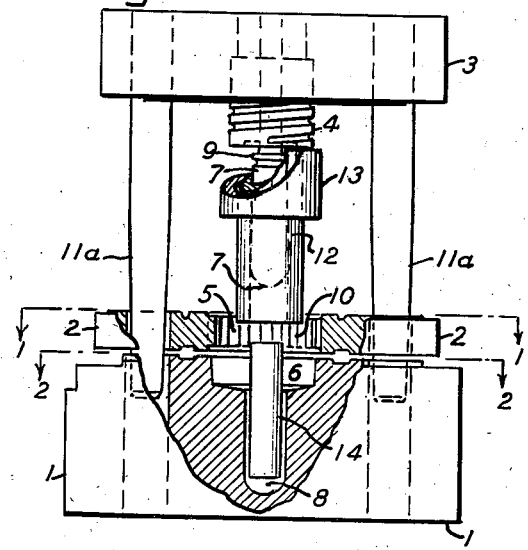
Fig. 3 is a side elevation of the molding press at the beginning of the molding operation with parts cut away for the sake of clarity.

The soft rubber composition defined above, having the consistency of a heavy dough, is fed into a tubing machine to form a tubing having an inside diameter at $\frac{11}{32}''$ and an outside diameter of $\frac{17}{32}''$. It is cut into suitable lengths while on the tubing machine by a circular knife. A further quantity of the soft rubber composition is fed into a tubing machine to form a cord having an outside diameter of $\frac{11}{32}''$. This cord is cut up into suitable lengths to form the plugs illustrated in Fig. 6.

The hard rubber composition is fed into a tubing machine and converted into tubing having an inside diameter of $\frac{9}{16}''$ and an outside diameter of one inch. Thus the inside diameter of the hard rubber tube is about sufficient to snugly embrace the outside diameter of the soft rubber tube.

The hard and soft rubber tubes are dusted with zinc stearate so as to slide on each other. The soft rubber tube 12 is placed over the spindle 7 with its end abutting the bottom face of cylinder member 4. A hard rubber tube 13 is slipped over the soft rubber tube and placed with its end abutting the bottom face of cylindrical member 4. Since the hard rubber composition is to be molded on the cylindrical surface of member 4 one would expect that the hard rubber tube should be placed on this surface. If it were possible to make this tubing of sufficient diameter to snugly embrace the cylindrical surface 4 and to fit it on the surface while the surface is hot, such procedure could be adopted. In practice it is preferable to arrange the tubes in the manner shown. The plug 14 is dropped into the recess 8. It would be of course preferable to insert the plug in the tube 12, but it is sufficient if it is laid in recess 8 without any particular precautions.

The member 3 of the press is then pressed downwardly until members 1, 2 and 3 abut. The press is heated by steam in a conventional manner. At the temperature of the press the hard rubber composition 13 becomes much less viscous than the soft rubber composition. Consequently, the soft rubber composition in the tube 12 and the plug 14 forces the hard rubber composition upwardly around the surface of cylindrical member 4. Upon the completion of the vulcanization of the soft rubber composition, the rubber in the skirt portion is softer than the rubber in the bulb portion.

At this point it is important to direct attention to the respective sizes of the tubes and the plug. The plug must be exactly the right size. If it is too large it will force the hard rubber composition too high in the mold whereby only a part of the skirt portion will be hard rubber. If it is too small, it will leave blisters and thin portions in the bulb portion. No exact formula can be given to cover every condition. The correct size of the plug and the tubes must be arrived at by experimentation. One particular set of dimensions is a soft rubber tube $1\frac{5}{8}''$ long, a hard rubber tube $\frac{5}{8}''$ long and a plug $1\frac{1}{8}''$ long with the diameters as specified above.

When the bulb and skirt portions are formed and united in the press they are taken out and cured with live steam. The live steam vulcanizes the hard rubber portion without affecting the soft rubber portion to any noticeable extent.

Figure 8:
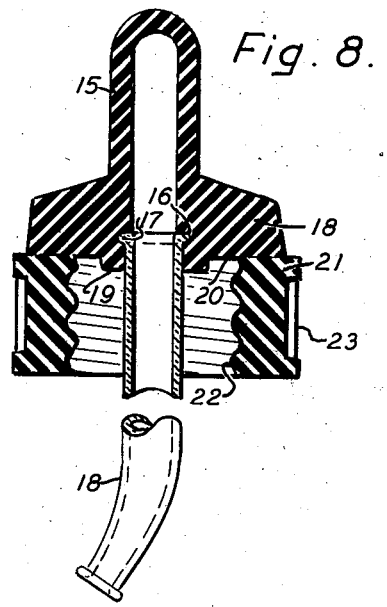

The finished article is shown in Fig. 8 in which 15 represents the bulb having near its lower end a circumferential groove 16 adapted to receive the flared end 17 of a glass tube 18. It is to be understood that, instead of a tube, a solid glass rod or a brush may be inserted. The lower end of the bulb 15 is in the form of a solid block 18 which, near its inner diameter, has a depending portion 19 adapted to fit into the neck of a bottle and a flat portion 20 adapted to form a seat for the rim of a neck of a bottle. Integrally united with the portion 18 is a skirt portion 21 bearing on its inside face threads 22 and on its outer face vertical corrugations 23. The skirt portion is customarily made of sufficient length so that when its thread is fully screwed on the thread of a bottle the rim of the bottle is sealed against the surface 20. If skirt portion 21 is too short, the pressure exerted on surface 20 by the continued screwing of the skirt portion on the neck of the bottle will tend to separate the soft rubber from the hard rubber.

Having thus described the nature and objects of our invention and illustrated a preferred embodiment of the same, which illustration, however, is not to be taken as definitive of the scope of our invention, what we claim as new and useful and desire to secure by Letters Patent is:

1. The process of manufacturing articles composed of hard and soft rubber integrally united which comprises composing one part of the body of a composition suitable for vulcanization into soft rubber and containing sulphur slightly in excess of that required for the formation of soft rubber, composing an adjacent portion of the body of a composition suitable for vulcanization into hard rubber, said compositions containing quantities of sulphur and accelerator such that the soft rubber composition becomes completely vulcanized in a substantially shorter period of time than said hard rubber composition, pressing the bodies together under conditions and for a time suitable for substantially completely vulcanizing the soft rubber composition, removing the same from the press and then subjecting the joined portions to conditions suitable for completing the vulcanization of the hard rubber composition.

2. The process of manufacturing articles composed of hard and soft rubber integrally united which comprises composing one part of the body of a composition suitable for vulcanization into soft rubber and containing sulphur slightly in excess of that required for the formation of soft rubber, composing an adjacent portion of the body of a composition suitable for vulcanization into hard rubber, said compositions containing quantities of sulphur and accelerator such that the soft rubber composition becomes completely vulcanized in a substantially shorter period of time than said hard rubber composition, applying zinc stearate to the surfaces to be joined, pressing the bodies together under conditions and for a time suitable for substantially completely vulcanizing the soft rubber composition, removing the same from the press and then subjecting the joined portions to conditions suitable for completing the vulcanization of the hard rubber composition.

3. The process of manufacturing a combined bottle stopper and syringe having a bulb, a seat portion and a threaded skirt portion, which comprises molding the bulb and seat portion of a composition suitable for vulcanization into soft rubber, molding the skirt portion of a composition suitable for vulcanization into hard rubber, said compositions containing quantities of sulphur and accelerator such that the soft rubber composition becomes completely vulcanized in a substantially shorter period of time than said hard rubber composition, pressing the two portions together under conditions and for a time suitable for substantially completely vulcanizing the soft rubber composition, removing the same from the press and then subjecting the joined portions to conditions suitable for completing the vulcanization of the hard rubber composition.

4. The process of manufacturing a combined bottle stopper and syringe having a bulb, a seat portion and a threaded skirt portion which comprises molding the bulb and seat portion of a composition suitable for vulcanization into soft rubber and containing sulphur slightly in excess of that required for the formation of soft rubber, molding the skirt portion of a composition suitable for vulcanization into hard rubber, said compositions containing quantities of sulphur and accelerator such that the soft rubber composition becomes completely vulcanized in a substantially shorter period of time than said hard rubber composition, pressing the two portions together under conditions and for a time suitable for substantially completely vulcanizing the soft rubber composition, removing the same from the press and then subjecting the joined portions to conditions suitable for completing the vulcanization of the hard rubber composition.

5. The process of manufacturing articles composed of hard and soft rubber integrally united which comprises composing one part of the body of a composition suitable for vulcanization into soft rubber, composing the adjacent portion of the body of a composition suitable for vulcanization into hard rubber, said compositions containing quantities of sulphur and accelerator such that said soft rubber composition becomes completely vulcanized in a substantially shorter period of time than said hard rubber composition, pressing the bodies together and subjecting the same to heat for a time suitable for substantially completely vulcanizing the soft rubber, removing the same from the press and subjecting the bodies to live steam for a time sufficient to vulcanize the hard rubber.

6. The process of manufacturing articles composed of hard and soft rubber integrally united which comprises composing one part of the body of substantially the following composition:—

| | Percentage |
|---|---|
| Smoked sheets | 30. |
| Trimene base (triethyltrimethylenetriamine) | .5625 |
| Captax (90 per cent Ceylon rubber and 10 per cent mercaptobenzothiazole mixed together) | .1875 |
| Carbon black | 4. |
| Guayule | 2. |
| Sulphur | 2.625 |
| Zinc oxide | 3.5 |
| Lime | .4375 |
| M. R. X. (asphalt-like hydrocarbon) | 3. |
| Rosin oil | 1. |
| Barytes | 18. |
| Cured scrap | 25. |
| West whiting | 9.6875 |
| | 100. | composing the other part of the body of substantially the following composition:—

| | Percentage |
|---|---|
| Smoked sheets | 30. |
| Guayule | 6. |
| Sulphur | 16. |
| Carbon black | 8. |
| Lime | 3. |
| Zinc oxide | 2. |
| Trimene base (triethyltrimethylenetriamine) | .125 |
| West whiting | 32.875 |
| Cottonseed oil | 2. |
| | 100. | pressing the bodies together while applying heat sufficient to completely vulcanize the first composition into soft rubber, removing the same from the press and subjecting the same to steam for a period of time to completely vulcanize the second composition into hard rubber.

LEON J. MAZOYER.
CECIL JONES.